Patented Feb. 27, 1945

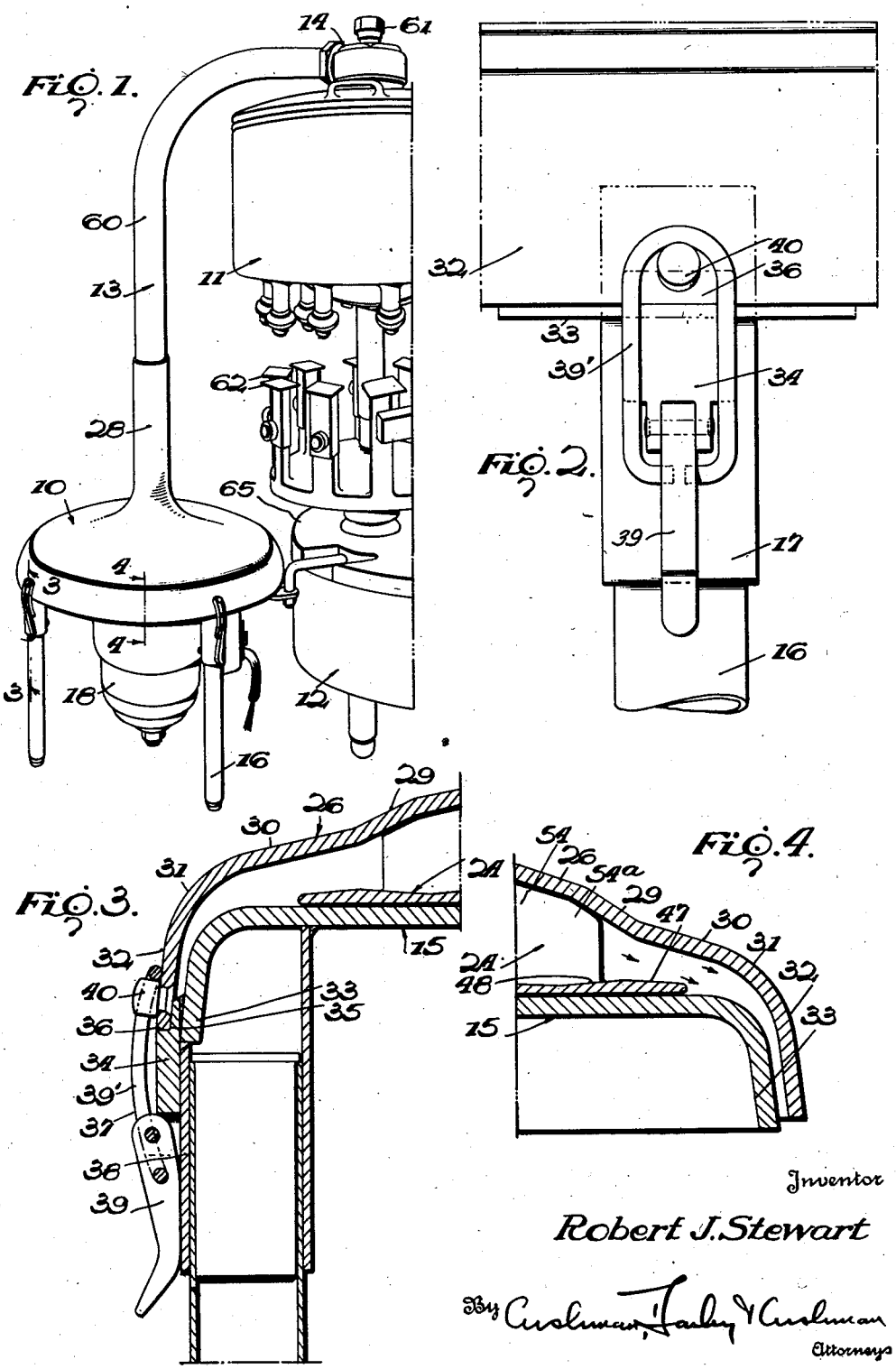

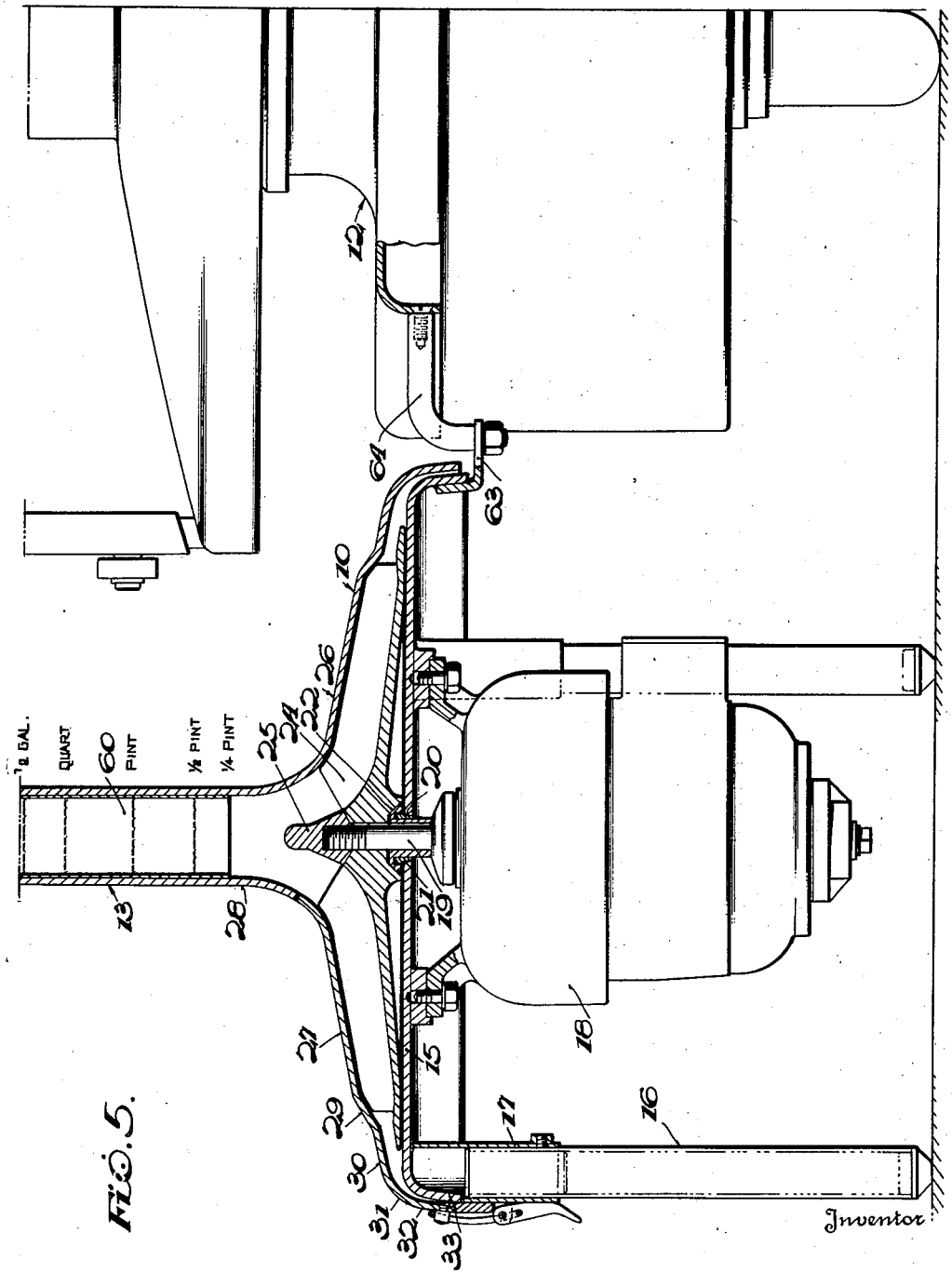

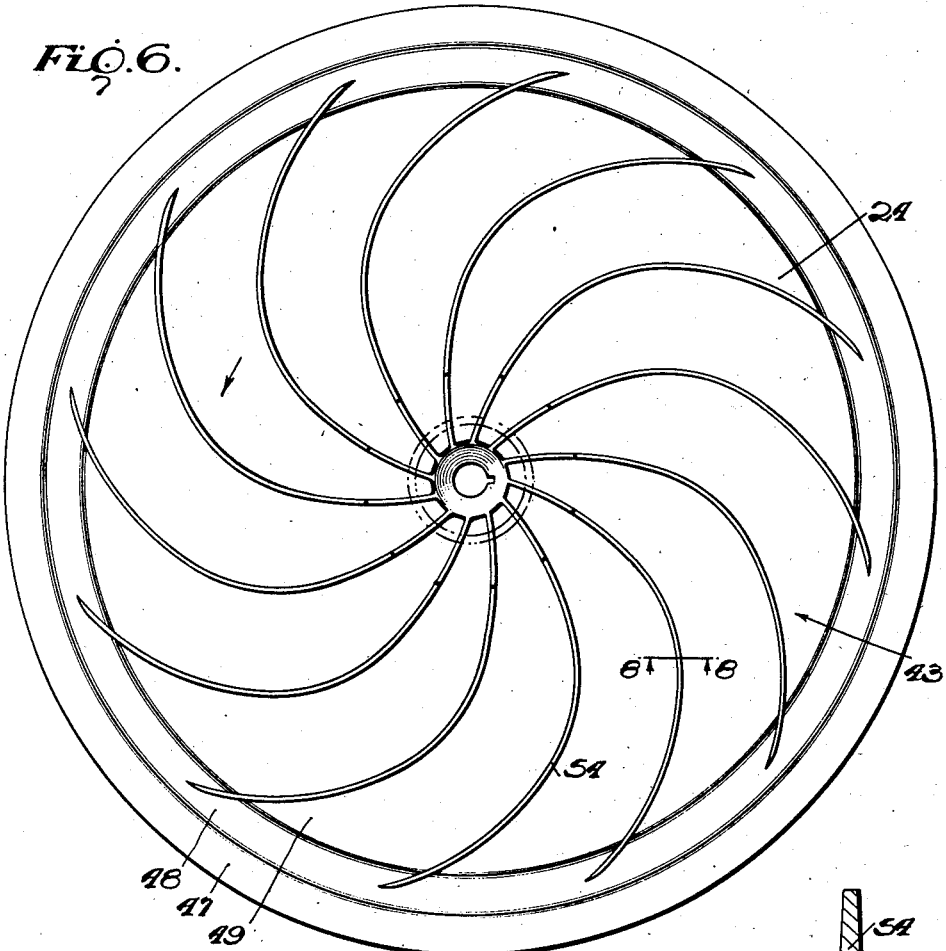
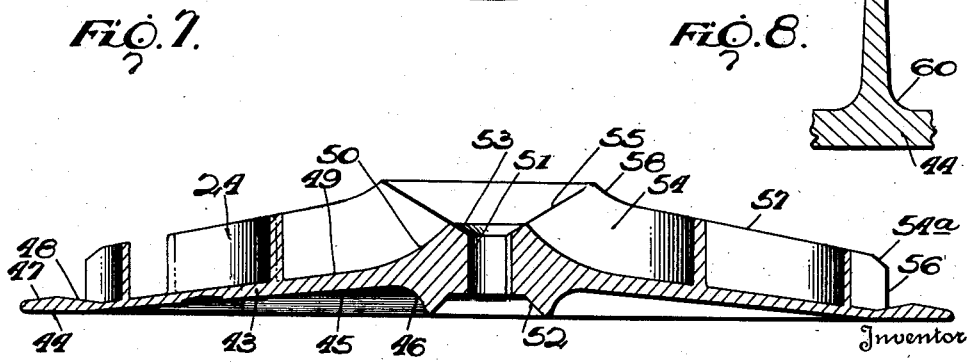

2,370,202

UNITED STATES PATENT OFFICE 2,370,202

VACUUM PRODUCING APPARATUS

Robert J. Stewart, Baltimore, Md., assignor to Crown Cork & Seal Company, Inc., Baltimore, Md., a corporation of New York Application September 14, 1942, Serial No. 458,260

5 Claims. (Cl. 103—103)

The present invention relates to a vacuum producing apparatus.

It has been found that milk can be flowed more efficiently into milk bottles or other containers by the use of a milk filler including a milk reservoir having a moderate vacuum therein.

While apparatus to provide a vacuum are well known, their assembly and their individual parts are designed solely for the purpose of contributing to the maintenance of a vacuum. The most important considerations with regard to any apparatus used in connection with the handling of milk are (1) that it may be readily taken apart for cleaning, (2) that when disassembled, all elements can be thoroughly cleaned, and (3) that it can be readily reassembled. The usual pumps for maintaining a vacuum do not meet these requirements because (1) they cannot be readily taken apart, (2) the individual parts are so formed as to include numerous crevices which are not accessible for cleaning, and (3) they can only be reassembled with great care to assure that all clearances are maintained.

The principal object of the present invention is to provide a vacuum producing apparatus for milk filling machines which will maintain as constant a value of vacuum as possible, at any rate up to the capacity of the pump, but is also so constructed that it can be readily taken apart for cleaning.

As has been stated above, because a vacuum producing apparatus to be used with milk fillers must be frequently cleaned, preferably by the use of steam, it is necessary that the operating parts of the device be of such construction that all surfaces can be readily reached when the apparatus is disassembled. For example, should a pump contain any crevices or areas which cannot be thoroughly cleaned, the pump will not be practicable for use with milk fillers.

Another object of the invention is to provide a vacuum producing apparatus having the various operating elements thereof of such design that they may be readily cleaned when the apparatus is disassembled.

The vacuum producer or pump of the present invention is of the central inlet and peripheral discharge type. Such pumps ordinarily comprise two casing elements with a vaned impeller between them. The impeller has usually been formed of two discs with vanes extending between them. Furthermore, at least one of the casing elements has been provided with a recess in which the adjacent impeller disc may move. Such a recess has been thought necessary to prevent turbulence.

The use of an impeller having two discs which thereby form a generally closed impeller is not suitable for use with milk filling machinery because it cannot be readily cleaned. In addition, the use of a recessed base plate is altogether impracticable because water or other cleaning fluid can gather in the recess and the recess also results in the provision of an annular crevice.

I have discovered that if the impeller is formed of a single disc with vanes projecting from one surface thereof and with one casing element shaped to closely conform to the contour of the edges of the vanes, the use of a closed impeller is obviated. The impeller open on one side provided by the present invention can readily be cleaned.

In addition, the use of a recessed casing element is eliminated by the present invention but without increase of turbulence. More particularly, by the present invention, the impeller has its single disc positioned adjacent a planar or non-recessed base plate, with the vanes extending toward a cover plate. The impeller includes an annular portion extending beyond the ends of the vanes and the inner surface of the cover plate and the opposed surface of the non-vaned portion of the impeller are so formed with respect to each other as to provide a venturi. The venturi increases the momentum of the air so that it does not become turbulent at the periphery of the disc.

As has been stated above, it is highly desirable to have all apparatus used in milk filling capable of being readily taken apart and reassembled. This presents a somewhat serious problem with an apparatus such as a vacuum pump in which close clearances are vitally necessary. The present invention includes means to accurately support the impeller in proper position with regard to a base plate or fixed casing element and to also accurately position a removable casing element or cover plate with regard to the impeller and the base plate, all without the necessity of any careful attention or measurements on the part of any attendant.

Other objects and advantages of the invention will be apparent from the accompanying drawings and following specification.

In the drawings—

Figure 1 is a perspective view showing the vacuum producing apparatus of the present invention assembled with a milk filling machine.

Figure 2 is an enlarged fragmentary view showing a detail of the vacuum producing apparatus.

Figure 3 is a detail vertical sectional view on the line 3—3 of Figure 1.

Figure 4 is a detail vertical sectional view on the line 4—4 of Figure 1.

Figure 5 is a view showing the vacuum producing apparatus in vertical section and the manner of securing the same to a milk filling machine, the adjacent portion of the filler also being shown in vertical section.

Figure 6 is a top plan view of the impeller used with the apparatus.

Figure 7 is a diametrical sectional view of the impeller, and

Figure 8 is a vertical sectional view on the line 8—8 of Figure 6.

Referring to Figure 1, the vacuum producing apparatus generally designated by the numeral 10 is connected to the reservoir 11 of a milk filling machine 12 by means of a telescopic pipe structure 13 extending from the inlet of the apparatus 10 to a connector 14 provided on the top of the filling machine 12. A preferred form of a connector 14 and a milk filling machine with which the present invention may be used is illustrated in the Patent No. 2,364,400, issued December 5, 1944, on application of Robert J. Stewart and Henry H. Franz, for Apparatus for filling. The connector 14 is described in detail in Patent No. 2,353,277, issued July 11, 1944, on the application of Robert J. Stewart and Henry H. Franz for Float valve for filling machines.

Referring to Figure 5, the vacuum producer 10 comprises a base plate 15 or casing element supported upon three or more legs 16 which extend downwardly from sockets 17 provided on the undersurface of the base plate. The legs 16 may be adjusted with respect to the base plate 15 so that the apparatus may be maintained level, the legs being held in the desired position by means of locking screws or the like.

An electric motor 18 to operate the vacuum producer is bolted beneath and centrally of the base plate 15 with its shaft 19 extending vertically and through an aperture 20 in the base plate. The aperture 20 has a ring 21 secured therein with a press fit. A collar 22 keyed to shaft 19 extends upwardly from within the motor casing and through the ring 21. Collar 22 also encloses ring 21 as shown in Figure 5 and for a purpose hereinafter described. The impeller 24 is held upon the shaft 19 by means of a cap nut 25.

The cover plate 26 forming the other casing element of the vacuum producing apparatus is upwardly inclined from a point adjacent its outer edge to its central portion and to thereby provide a generally conical wall 27 which merges curvilinearly into an upwardly extending tube 28 forming part of the telescopic pipe structure 13. The outer edge of the conical wall portion 27 extends to an inclined step 29 and beyond the step 29 the cover plate is downwardly inclined as at 30 to a rounded portion 31 leading downwardly to a substantially vertical skirt 32. As best shown in Figure 4, the skirt 32 is positioned opposite to and spaced from a downwardly extending flange 33 on the base plate 15.

The cover plate 26 is entirely supported in properly spaced relation to the impeller 24 and the base plate 15 in the manner illustrated in Figures 2 and 3. That is, supporting blocks 34, preferably three in number, are equidistantly spaced about the flange 33, the blocks 34 being recessed at their upper and outer portions to provide a wall 35 having the same slight inclination from the vertical as the inner surface of cover plate skirt 32 and to also provide an upwardly facing shoulder 36 upon which the lower edge of the skirt 32 rests. The depending flange 33 of base 15 is provided with locks or latches 37 mounted on plates 38 projecting down from flange 33. The latches 37 preferably comprise operating levers 39 on the plates 38 and carrying loops 39' adapted to engage projections 40 on the skirt 32 of the cover plate, the loops 39' being slightly bowed as shown in Figure 3 to exert a downward tension on the cover plate. As is shown, the loops are so connected to their operating levers 39 that they will be locked in cover plate holding position.

As is hereinafter more fully described, the blocks 34 cooperate with the depending skirt 32 of cover plate 26 to securely register the latter with both the base plate 15 and the impeller 24 against both vertical and horizontal movement.

The impeller 24 is best shown in Figures 6 to 8 and comprises a base or disc portion 43 provided with an annular edge portion 44 which is flat on its lower surface. From this flat annulus the disc 43 may have its lower surface upwardly inclined as indicated at 45 to the center of the impeller and then rounded downwardly to form a boss 46. However, if desired, the entire under surface of the disc 43 may be flat instead of recessed as above described.

The upper surface of disk 43 above edge portion 44 is convex, being formed of an upwardly inclined surface 47 and a downwardly inclined surface 48. The downwardly inclined surface 48 terminates in an upwardly inclined portion 49 extending over the major portion of the impeller in a radial direction and which leads to an upwardly curved central portion 50. An aperture 51 is provided in the center of the impeller which communicates with a downwardly facing recess or socket 52 and an upwardly facing and outwardly inclined recess or socket 53.

The vanes 54 of the impeller are spiralled as indicated in plan in Figure 6 and extend from the upwardly rounded portion 50 at the center of disc 43 and on to the inwardly and downwardly inclined portion 48 adjacent its perimeter. As shown in Figure 7, the inner edges 55 of the vanes are outwardly and upwardly inclined along lines which are a continuation of the surface of the upper socket 53. The outer upper edges of the vanes are angled as indicated at 54a but they then extend vertically as at 56 to join the disc 43. The upper edges 57 of the vanes are downwardly inclined throughout the major portion of their length but are rounded upwardly as at 58 immediately adjacent their inner edges 55. In addition, the height of the vanes slightly varies from their inner portion to their outer portion, that is, their upper edges are inclined downwardly at a very slightly greater angle than the angle at which the major portion 49 of the upper surface of the base is downwardly inclined. For example, the angle of surface 49 may be 7½° from the horizontal when the angle of the upper edges of the vanes is 12° from the horizontal.

Figure 8 shows the cross sectional form of the vanes 54 and illustrates that they are inwardly tapered to their flat upper edge but that they are joined to the boss 44 by a rounded portion 60.

As best shown in Figure 5, the impeller 24 is secured to the shaft 19 of the motor by aligning the aperture 51 of the impeller with the motor shaft and then threading the cap nut 25 upon the upper end of the shaft. The aperture 51 includes a key slot to fit a key upon the shaft. The cap nut 25 is rounded at its upper end and then tapered on its outer surface so as to merge with the central portion 50 of the upper surface of impeller disc 43. As shown in Figures 5 and 7, the lower recess 52 of the impeller has an inclined outer wall and the collar 22 has a similarly inclined surface. The collar 22 extends down about the ring 21 fixed in base 15 and to a point closely adjacent the upper surface of base 15.

When the impeller is assembled as shown in Figure 5, the flat outer portion 44 of its undersurface will be positioned closely adjacent the outer portion of the base 15, the weight of the impeller resting upon the collar 22 which rotates with motor shaft 19. When the cover plate 26 is secured to the base plate 18, the lower portion of the inlet tube 28 will closely conform to the rounded inner surface portion 58 of the vanes 54 because the lower portion of tube 28 is rounded in radial section on the same center as is used in fixing the curvature of the edge portions 58 of the vanes. The downwardly inclined or conical wall portion 27 and the inclined step 29 of cover plate 26 are respectively inclined at the same angles as the upper edges 57 and outer upper edges 54a of the vanes so these surfaces will closely conform to the opposite surfaces of the vanes. The outer portion 30 of the cover plate is inclined downwardly at such an angle that it will approach the base plate 15 and the downwardly rounded portion 31 of the cover plate will further restrict the space between the inner surface of the outer portion of the cover plate and the rounded edge of the base plate. As best shown in Figure 4, the space between the depending skirt 32 on the cover plate and the depending flange 33 on the base plate is substantially constant in cross sectional area but is much more restricted than any of the areas leading thereto. As a result, the peripheral discharge of the vacuum producer will be of substantially restricted area in radial section as compared to any of the areas leading thereto.

As stated above, the vanes 54 are spiralled, thereby cooperating with the base 15 and cover plate 26 to provide a peripheral discharge. Since the discharge is restricted, the velocity of the exhausted air will be raised adjacent the discharge point. Since the momentum of the moving air increases as the square of the velocity, the air cannot become turbulent at the tips of the impeller blades and this preserves effective negative pressures on the trailing concave portions of the plates.

Prior vacuum pumps provided with an impeller rotating on a vertical axis adjacent a base surface have so mounted the impeller that a disc portion thereof will be positioned in a recess in at least one of the casing elements, but the provision of such a recess in the base plate 15 would be undesirable in a vacuum pump for use with a milk filler. In order to avoid such a recess, the impeller 24 included in the present invention has the disc 43 extending substantially beyond the outer ends 56 of the impeller vanes 54 to form a non-vaned portion and, in addition, the outer portion of the disc is inclined upwardly as at 48 adjacent to the ends of the vanes and beyond the ends of the vanes on the non-vaned portion. Finally, the non-vaned portion is inclined downwardly as at 47. Since the inclined stepped portion 29 of the cover plate is positioned opposite the upwardly inclined portion 48 of the disc, a venturi is formed at this point which discharges into a further restriction between the downwardly inclined portion 30 of the cover plate and the downwardly inclined surface 47 of the disc because these surfaces converge. It will be observed that the venturi causes the air to move at increased momentum when it moves past the downwardly inclined surface 47 and it therefore cannot turbulate at the edge of that surface, i. e., the edge of the disc 43. In this way, the necessity of having the impeller recessed in the base 15 is avoided.

As has been stated above, the tube 28 of the cover plate 26 forms part of the telescopic pipe structure 13. Tube 28 forms the lower and outer portion of the structure 13, the inner and upper portion comprising a pipe 60 secured in the connector 14 which is held against rotation with the filling reservoir 11 by the stationary tube 28. Milk is delivered to the reservoir 11 of the filling machine through an inlet 61 as described in the above-mentioned patents issued on applications of Robert J. Stewart and Henry H. Franz.

The fitting of pipe 60 in stationary tube 28 enables pipe 60 and connector 14 to be held against rotation with reservoir 11 without the use of any other brackets secured to or carried by the connector 14 or pipe 60. The elimination of such brackets enables the entire structure to be cleaned more readily and thoroughly.

In order to enable the milk filler 12 to handle bottles of different heights, the reservoir 11 is vertically adjustable with respect to the bottle supporting platforms 62 associated with the base 65 of the filler by a mechanism such as disclosed in Patent No. 2,329,954, issued September 21, 1943, on the application of Robert J. Stewart and Henry H. Franz for Filling machines. Any vertical movement of reservoir 11 will cause the pipe 60 to also move either upwardly or downwardly with respect to the upper end of tube 28. As is indicated in Figure 5, the pipe 60 may be positioned at various points vertically with respect to tube 28 when bottles of different heights are to be handled on the milk filler.

The vacuum producing apparatus 10 is secured to the milk filler 12 by means of a lug 63 extending outwardly from the flange 33 and apertured to receive a keeper 64 secured to the base of the milk filler.

The vacuum producing apparatus can be taken apart for cleaning by disconnecting the pipe 60 and then releasing the latches 37. After this has been done, the cap screw 25 can be removed and the impeller 24 can then be lifted from shaft 19. It will be noted that when the cover plate and impeller have been removed, a planar surface is exposed on the base plate 15 except for the shaft 19. However, the downward inclination of the collar 22 which extends above and outwardly of the upwardly projecting ring 21 will prevent any steam or water from moving downwardly through the aperture 20 in the base plate and eliminates crevices.

Because the impeller contains no sharp corners, it can readily be cleaned and the same is true of the cover plate 26.

In replacing the impeller 24 upon the shaft 19, the proper clearance between the impeller and the base plate 15 will be fixed by contact of the walls of the impeller recess 52 with the collar 22 so that the attendant need only apply the cap screw 25 to complete the mounting of the impeller. The tapering of recess 53 in the impeller will enable the correspondingly tapered lower end of the cap screw to securely center the impeller on shaft 19. With regard to the replacing of the cover plate 26, its position will be absolutely fixed vertically of the apparatus by contact of the lower edge of cover plate skirt 32 with the upwardly facing shoulders 36 on the blocks 34. The surfaces 35 on the blocks 34 which are outwardly inclined at their lower ends on the same angle from the vertical as the inner surface of the lower edge of the skirt will assure that the cover plate will be mounted concentrically with the impeller 24 and the base plate 15.

It will be noted that the tapered recess 52 is of greater depth than the tapered portion of the collar 22 so that wear between facing tapered surfaces will be compensated for and a fit between all surfaces can be quickly obtained without possibility of any play still existing between parts. Furthermore, by the present invention, all parts of a vacuum producer can be assembled in properly aligned position with the correct clearances established immediately the respective holding means such as the latches 37 and the cap nut 25 are brought into contact with their coacting elements. That is, proper positions are obtained upon contact or engagement of the holding means, and no set-screw adjustments need be made or measurements taken to assure that proper fit is obtained.

It will be understood from the above that the invention provides an efficient vacuum producer for use with milk filling machinery and which can be readily taken apart, thoroughly cleaned, and then reassambled without any careful attention on the part of the attendant to operating clearances.

The terminology used in the specification is for the purpose of description and not limitation, the scope of the invention being indicated in the claims.

I claim:

1. In a vacuum producing apparatus, a circular base plate having an upwardly facing planar surface and a flange depending from its periphery, an impeller rotatable on said base plate including a disc portion provided with upstanding spiralled vanes, said disc portion being closely spaced above said base plate and including a non-vaned portion extending beyond the outer ends of the vanes, a cover plate positioned above said impeller and including a depending skirt positioned opposite and spaced from the depending flange on said base plate to define an outlet, said cover plate being provided with a central inlet aperture and having its lower wall adjacent the top edges of the impeller vanes throughout the major portion of the length of said vanes, the lower surface of said cover plate and the upper surface of the impeller disc being so angled with respect to each other as to provide a venturi to increase the momentum of the air before it moves past the peripheral edge of the impeller disc.

2. In a vacuum producing apparatus, a base plate having an upwardly facing planar surface and a depending flange at its perimeter, a motor supported beneath said base plate with its driving shaft extending upwardly through a central aperture in the base plate, an impeller keyed to said motor shaft, a cap nut on the upper end of said shaft to hold the impeller thereon, and a cover plate having a lower surface to closely conform to the upper contour of the impeller and including a depending skirt positioned opposite the depending flange of the base plate to form an outlet, said cover plate having an upwardly facing inlet centrally located thereon.

3. In a vacuum producer, a base plate including a depending flange at its perimeter, an impeller rotatable on said base plate and including upstanding vanes, a cover plate provided with a central inlet aperture and a depending skirt, the contour of said cover plate closely conforming to the contour of the upper edges of said vanes, and cooperating means carried on the depending base plate flange and the skirt of said cover plate, respectively, to secure the cover plate against vertical and horizontal movement with respect to said base plate and to maintain an outlet space between the flange and skirt.

4. In a vacuum producer, a base plate including a depending flange at its perimeter, an impeller rotatable on said base plate and including upstanding vanes, a cover plate provided with a central inlet aperture and a depending skirt, the contour of said cover plate closely conforming to the contour of the upper edges of said vanes, said base plate flange having radially projecting blocks adjacent its lower edge, said blocks being recessed at their upper outer portions to form a vertical wall and a horizontal wall, the lower edge of said cover plate skirt being adapted to bear on said horizontal wall with the inner surface of the cover plate skirt bearing on the vertical wall of said recess to thereby hold the cover plate skirt horizontally spaced from the depending flange to form an outlet, and means to lock the cover plate to said blocks.

5. In a vacuum producing apparatus, a base plate, a cover plate and an impeller positioned between said plates, said base plate having an upwardly facing planar surface, a motor supported beneath said base plate with its driving shaft extending upwardly through a central aperture in the base plate, said shaft having an upwardly facing tapered portion thereon, an impeller provided with a central bore to fit said shaft and opening to a downwardly facing recess tapered to fit the tapered portion of said shaft, the bore of said impeller including an upwardly facing tapered recess, and a cap nut threaded on said shaft and tapered at its lower portion to bear upon the upwardly facing tapered recess in the impeller, said tapered shaft portion, recesses and cap nut coacting to enable the impeller to be quickly and positively centered on said shaft and with respect to said cover plate.

ROBERT J. STEWART.